US012655678B2

(12) United States Patent
Abbad et al.

(10) Patent No.: US 12,655,678 B2
(45) Date of Patent: Jun. 16, 2026

(54) PERFORATED DEVICES AND GLAZINGS COMPRISING SAME

(71) Applicant: SAINT-GOBAIN GLASS FRANCE, Courbevoie (FR)

(72) Inventors: Ahmed Abbad, Compiegne (FR); Jean-Philippe Boure, Ribecourt-Dreslincourt (FR); Fabien Dalzin, Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 183 days.

(21) Appl. No.: 18/559,253

(22) PCT Filed: May 6, 2022

(86) PCT No.: PCT/FR2022/050871

§ 371 (c)(1),
(2) Date: Nov. 6, 2023

(87) PCT Pub. No.: WO2022/234237

PCT Pub. Date: Nov. 10, 2022

(65) Prior Publication Data

US 2024/0229542 A1 Jul. 11, 2024

(30) Foreign Application Priority Data

May 7, 2021 (FR) ...................................... 2104878

(51) Int. Cl.
*E06B 3/663* (2006.01)

(52) U.S. Cl.
CPC ...... *E06B 3/66361* (2013.01); *E06B 3/66314* (2013.01)

(58) Field of Classification Search
CPC .................................................. E06B 3/66361
USPC ........................................................... 428/34
See application file for complete search history.

(56) References Cited

U.S. PATENT DOCUMENTS

| | | | | |
|---|---|---|---|---|
| 5,598,669 A * | 2/1997 | Hamdi | E06B 3/6707 52/786.13 |
| 6,537,629 B1 * | 3/2003 | Ensinger | E06B 3/66323 428/167 |
| 6,668,974 B1 * | 12/2003 | Mottelet | E06B 3/6707 52/786.13 |
| 8,851,423 B1 * | 10/2014 | Lewis | B64C 1/1492 181/207 |

(Continued)

FOREIGN PATENT DOCUMENTS

| | | |
|---|---|---|
| CH | 547426 A * | 3/1974 |
| DE | 1659661 A1 * | 1/1971 |

(Continued)

OTHER PUBLICATIONS

Machine_English_translation_DE_2350602_A1; Steiner et al.; Double Glass Windows for heat and sound insulation; Apr. 24, 1975; EPO; whole document (Year: 2025).*

(Continued)

*Primary Examiner* — Tahseen Khan
(74) *Attorney, Agent, or Firm* — CUSHMAN PARTNERS LLC

(57) ABSTRACT

A glazed unit includes at least two glazed walls forming between them a cavity, wherein the cavity includes at least one device including at least one plate, the plate including a plurality of perforations arranged periodically and defining a chamber arranged in the cavity.

17 Claims, 2 Drawing Sheets

(56) References Cited

U.S. PATENT DOCUMENTS

| | | | | |
|---|---|---|---|---|
| 2010/0300800 | A1 | 12/2010 | Leconte et al. | |
| 2011/0236609 | A1* | 9/2011 | Jones | E06B 3/66304 428/34 |
| 2012/0315409 | A1* | 12/2012 | Jones | E06B 3/6733 428/34 |
| 2013/0101759 | A1* | 4/2013 | Jones | E06B 3/6612 428/34 |
| 2014/0037869 | A1* | 2/2014 | Petrmichl | E06B 3/663 428/34 |
| 2016/0108659 | A1* | 4/2016 | Stark | B32B 7/14 52/786.1 |

FOREIGN PATENT DOCUMENTS

| | | | |
|---|---|---|---|
| DE | 2350602 | A1 * | 4/1975 |
| DE | 28 03 740 | A1 | 8/1979 |
| EP | 0 579 542 | A1 | 1/1994 |
| FR | 2 693 754 | A1 | 1/1994 |
| JP | 2003-063844 | A | 3/2003 |
| JP | 2016-183083 | A | 10/2016 |
| KR | 10-2013-0019753 | A | 2/2013 |
| WO | WO 01/14681 | A1 | 3/2001 |

OTHER PUBLICATIONS

Machine_English_translation_CH_547426_A; Sitelines; Structure Refermant Volume; Mar. 29, 1974; EPO; whole document (Year: 2025).*

Machine_English_translation_DE_1659661_A1; Doppelglass mit guter schallabsorption in Richard et al.; Jan. 21, 1971; EPO; whole document (Year: 2025).*

International Search Report as issued in International Patent Application No. PCT/FR2022/050871, dated Aug. 2, 2022.

* cited by examiner

[Fig. 1]
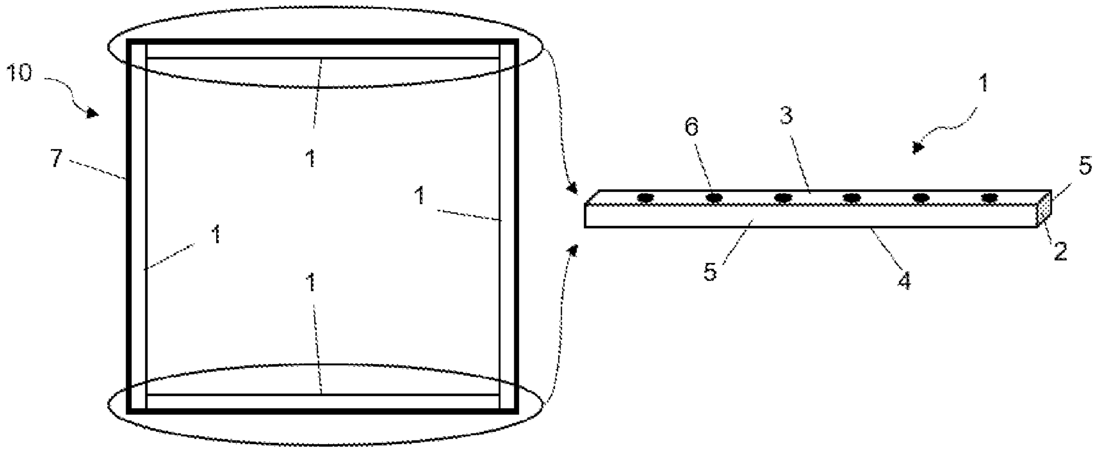
[Fig. 2]
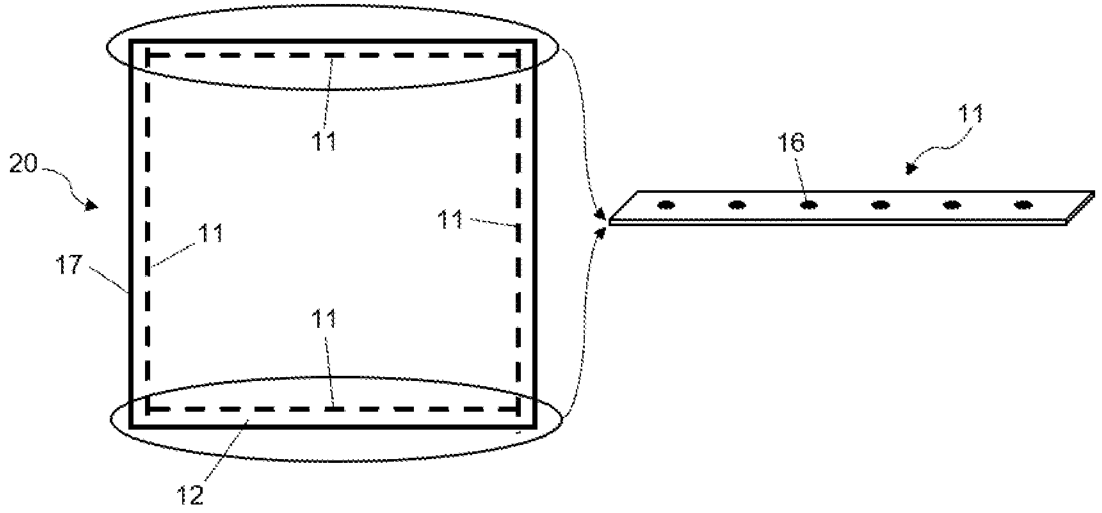
[Fig. 3]
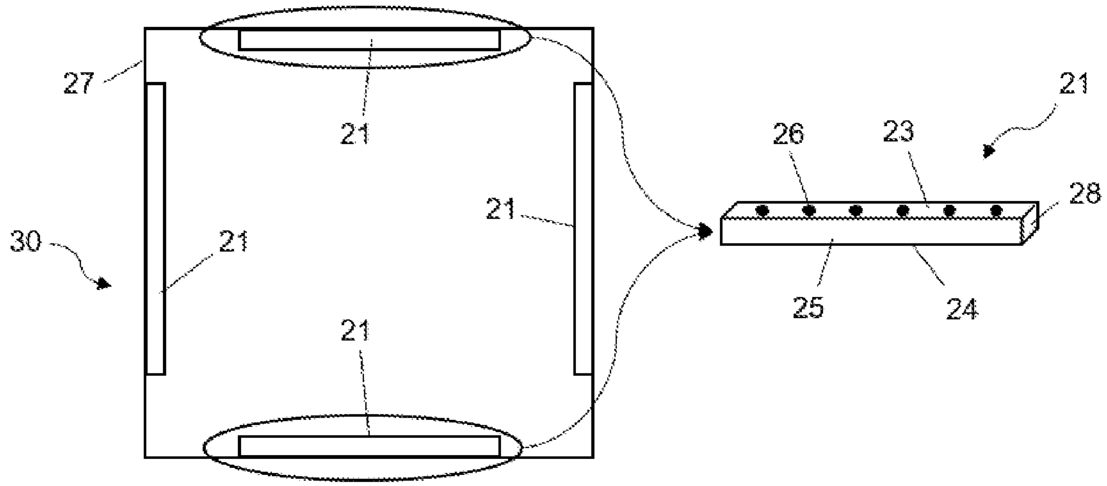

[Fig. 4]
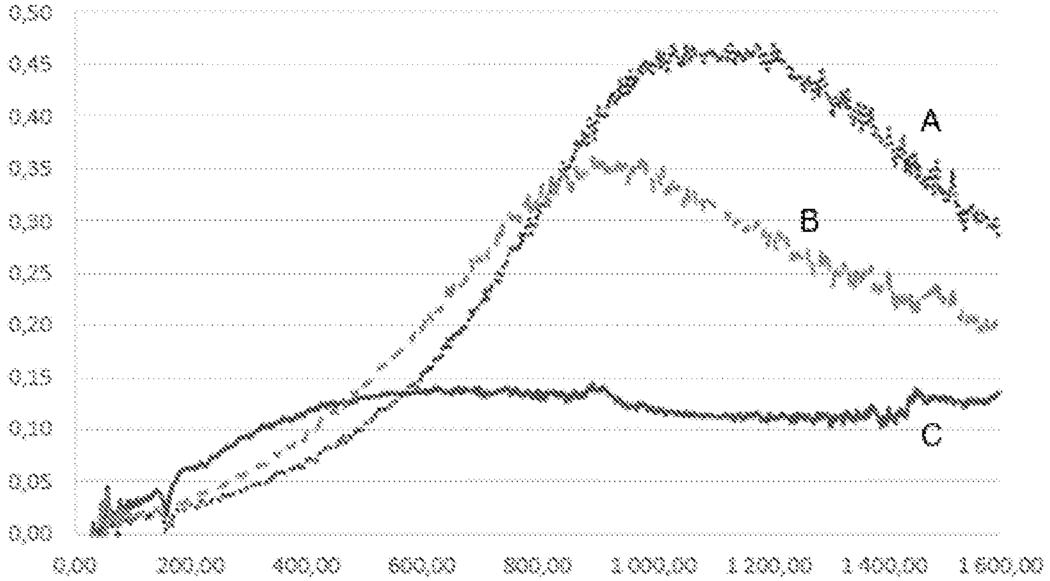
[Fig. 5]
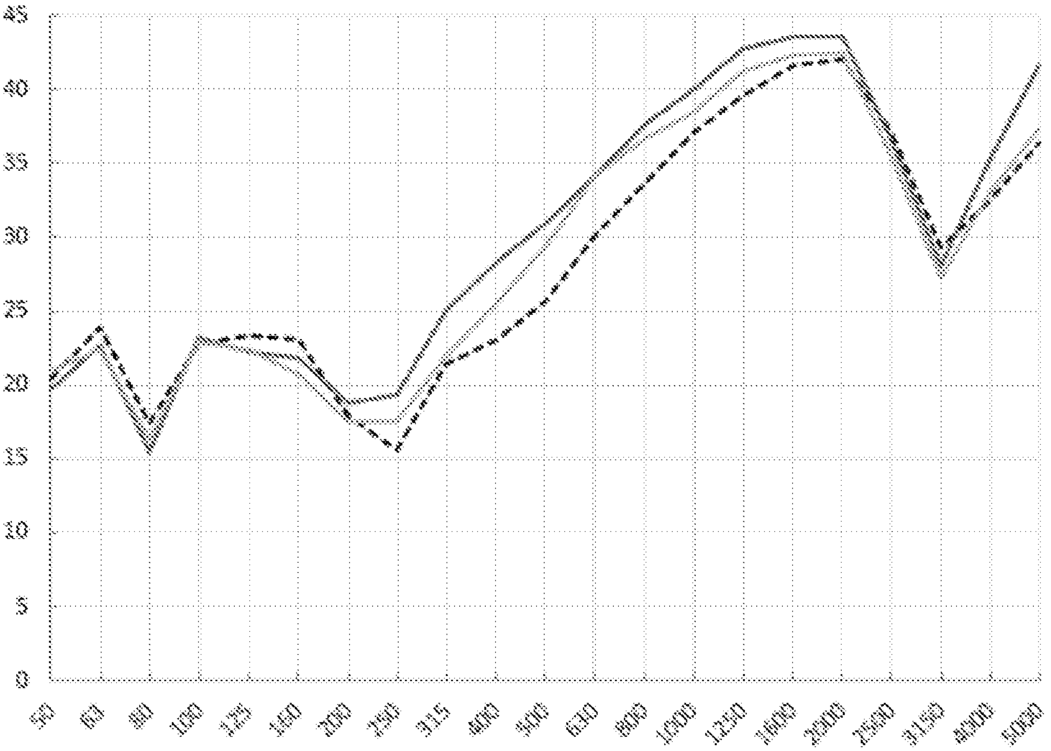

PERFORATED DEVICES AND GLAZINGS COMPRISING SAME

CROSS-REFERENCE TO RELATED APPLICATIONS

This application is the U.S. National Stage of PCT/FR2022/050871, filed May 6, 2022, which in turn claims priority to French patent application number 2104878 filed May 7, 2021. The content of these applications are incorporated herein by reference in their entireties.

FIELD OF THE INVENTION

The present invention relates to perforated devices for glazed unit, particularly spacer devices, and a glazed unit comprising such devices.

TECHNICAL BACKGROUND

Double glazed units consisting of two glass panes separated by a cavity filled with gas, typically air, are conventionally used in windows and facades of buildings for their thermal and acoustic insulation performance.

However, the loss of transmission of the sound caused by such double glazed units decreases for frequencies surrounding the frequency referred to as "mass/spring/mass" corresponding to the resonant frequency of the double glazed unit and located in the low frequencies. This phenomenon, called the mass/spring/mass effect, is due to significant variations in pressure in the air cavity at the mass/spring/mass frequency.

Different solutions have been developed in order to improve the acoustic insulation performance of the glazed units.

Document US 2010/0300800 describes acoustic glazed units, in particular aircraft cockpit glazed units, comprising a first glass plate separated from a second intermediate glass plate by a layer of acoustic PVB (polyvinyl butyral), the second glass plate being separated from a third glass plate by a layer of standard PVB or of polyurethane.

However, this solution does not make it possible to improve the acoustic insulation at low frequencies. To improve acoustic insulation at low frequencies, an existing passive solution is to increase the thickness of the glass plates or the thickness of the cavity of the glazed unit. However, this leads to bulky and very heavy structures.

There is therefore a real need to provide a system making it possible to improve the acoustic insulation properties of a glazed unit, particularly in the low frequencies, while making it possible to obtain a relatively lightweight and compact glazed unit.

SUMMARY OF THE INVENTION

The invention relates firstly to a glazed unit comprising at least two glazed walls forming a cavity between them, wherein the cavity comprises at least one device comprising at least one plate, said plate comprising a plurality of perforations arranged periodically and delimiting a chamber arranged in the cavity.

In some embodiments, the plate of the device comprises at least three perforations, preferably at least four perforations.

In some embodiments, the perforations have a diameter or maximum dimension of 0.2 mm to 8 mm, preferably of 0.5 mm to 8 mm.

In some embodiments, the centers of the perforations are spaced apart by a distance of 5 mm to 200 mm, preferably of 10 mm to 110 mm.

In some embodiments, the plate has a thickness of 0.1 mm to 15 mm, preferably of 0.2 mm to 1 mm.

In some embodiments, the plate and the chamber are configured to resonate at a low frequency.

In some embodiments, the plate is made of metal material, preferably aluminum and/or stainless steel, and/or polymer material, preferably polyethylene, polycarbonate, polypropylene, polystyrene, polybutadiene, polyisobutylene, polyester, polyurethane, polymethyl methacrylate, polyacrylate, polyamide, polyethylene terephthalate, polybutylene terephthalate, acrylonitrile, butadiene styrene, acrylonitrile styrene acrylate, styrene-acrylonitrile copolymer, or a combination thereof, the polymer material being optionally reinforced with glass fibers.

In some embodiments, the glazed unit comprises at least two plates, preferably at least three plates, each comprising a plurality of perforations arranged periodically and delimiting a chamber arranged in the cavity, preferably the periodicities of the perforations of at least two of the plates, more preferentially of at least three plates, are different from one another.

In some embodiments, at least one plate of the device comprising a plurality of perforations arranged periodically and the chamber that it delimits are configured to resonate at the mass/spring/mass frequency of the glazed unit.

In some embodiments, the device further comprises:

- at least one second plate comprising a plurality of perforations arranged periodically and delimiting a second chamber arranged in the cavity, said second plate and chamber being configured to resonate at the frequency one octave-third less than the mass/spring/mass frequency of the glazed unit; and
- at least one third plate comprising a plurality of perforations arranged periodically and delimiting a third chamber arranged in the cavity, said third plate and chamber being configured to resonate at the frequency one octave-third greater than the mass/spring/mass frequency of the glazed unit.

In some embodiments, the device is a spacer device attached to each of the two glazed walls and comprises at least one rectilinear tubular profile comprising at least an upper wall, a lower wall and two side walls defining the chamber, wherein the upper wall constitutes the plate comprising a plurality of perforations arranged periodically.

In some embodiments, the chamber of the profile has a thickness, between the upper wall and the lower wall of the profile, of 2 mm to 200 mm, preferably of 5 mm to 50 mm.

In some embodiments, the device is a spacer device attached to each of the two glazed walls and comprises at least one rectilinear bar, wherein the bar constitutes the plate comprising a plurality of perforations arranged periodically, said bar defining the chamber with the two glazed walls, said chamber extending between the two glazed walls, from the bar to an edge of the glazed unit.

In some embodiments, the chamber has a thickness, between the bar and the edge of the glazed unit, of 2 mm to 200 mm, preferably of 5 mm to 50 mm.

In some embodiments, the device comprises a rectilinear casing comprising at least an upper wall, a lower wall, two longitudinal side walls and two transverse side walls defining the chamber, wherein the upper wall or one of the longitudinal side walls constitutes the plate comprising a plurality of perforations arranged periodically, the width of said casing being less than the thickness of the cavity between the two glazed walls in the same direction and, preferably, the length of said casing being less than the length of the cavity in the same direction.

In some embodiments, the chamber of the casing has a thickness, between the wall of the casing comprising the perforations arranged periodically and the wall opposite the latter, of 2 mm to 200 mm, preferably of 5 mm to 50 mm.

Advantageously, an absorbent material is present inside the chamber.

Advantageously, the absorbent material is at least selected from a porous absorbent material and a granular absorbent material.

In some embodiments, a porous absorbent material is present inside the chamber, preferably selected from the group consisting of mineral wools, textile fibers, polymer foams and combinations thereof.

Advantageously, the granular absorbent material is at least selected from a stack of particles made of polymer material and sand.

In some embodiments, the device is positioned in a peripheral zone of the cavity of the glazed unit.

In some embodiments, the glazed unit is a construction glazed unit, such as a glazed unit of a building facade, window or door, or an interior glazed unit.

The invention also relates to a spacer device for glazed unit comprising at least one rectilinear tubular profile comprising at least an upper wall, a lower wall and two side walls defining a chamber, wherein the upper wall comprises a plurality of perforations arranged periodically.

The invention also relates to a spacer device for a glazed unit comprising at least a rectilinear bar comprising a plurality of perforations arranged periodically.

The invention also relates to a device for glazed unit comprising at least one rectilinear casing comprising at least an upper wall, a lower wall, two longitudinal side walls and two transverse side walls defining a chamber, wherein the upper wall or one of the longitudinal side walls comprises a plurality of perforations arranged periodically.

The present invention makes it possible to meet the need expressed herein before. It more particularly provides a device for glazed unit making it possible to obtain a glazed unit having improved acoustic insulation, particularly in the low and medium frequencies, but also in the high frequencies, while being able to be relatively light and compact.

This is accomplished by virtue of the presence, in the device, of a plate on which a plurality of perforations are periodically arranged, said plate allowing the formation of a chamber. The combination of the presence of said chamber with the presence of perforations on the plate, these perforations being periodic, allows the creation of resonators making it possible to absorb at least part of the sound energy in the cavity of the glazed unit formed by the two glazed walls, which makes it possible to reduce the transmission of sound through the glazed unit. In particular, the resonators absorb the sound energy significantly for frequencies close to their resonant frequency(ies). In addition, the energy absorption also for the harmonic frequencies of the resonators as well as physical phenomena related to the modification of the properties of the gas cavity of the glazed unit, due to the presence of the resonators, make it possible to also improve acoustic insulation at frequencies higher than the resonant frequencies of the resonators.

According to certain particular embodiments, the plate and its perforations, and the chamber, can be dimensioned in such a way that the system formed by the plate and the chamber resonates at the mass/spring/mass frequency of the glazed unit or at a frequency close to it, making it possible to reduce the mass/spring/mass effect.

BRIEF DESCRIPTION OF THE FIGURES

FIG. 1 shows on its left-hand side an example of glazed unit according to the invention and, on its right-hand side, an enlarged, perspective schematic view of the profile of an example of a device according to the invention present in this example of glazed unit.

FIG. 2 shows on its left-hand side another example of glazed unit according to the invention and, on its right-hand side, an enlarged, perspective schematic view of the casing of an example of a device according to the invention present in this example of glazed unit.

FIG. 3 shows on its left-hand side another example of glazed unit according to the invention and, on its right-hand side, an enlarged, perspective schematic view of the bar of an example of a device according to the invention present in this example of glazed unit.

FIG. 4 shows the acoustic energy absorption coefficient (on the Y-axis) of device no. 1 (curve A), device no. 2 (curve B) and device no. 3 (curve C) as described in example 1 hereunder, as a function of the sound frequency (on the X-axis, in Hz).

FIG. 5 shows the acoustic attenuation index R (on the Y-axis, in dB) of glazed unit no. 1 (light gray solid curve), of glazed unit no. 2 (dark gray solid curve) and of glazed unit no. 3 (black dotted curve) as described in example 2 hereunder, as a function of the sound frequency (on the X-axis, in Hz).

DETAILED DESCRIPTION

The invention is disclosed below in greater detail and in a non-limiting manner in the following disclosure.

The invention relates firstly to a device for glazed unit.

The glazed unit may be any type of glazed unit comprising at least two glazed walls defining a cavity therebetween. Within the meaning of the present invention, the cavity of a glazed unit is defined as being the volume between two glazed walls of said glazed unit.

The device according to the invention may be a spacer device for glazed unit. "Spacer device" means any device making it possible to set the length of the spacing between the glazed walls of the glazed unit in which it is intended to be placed.

Alternatively, the device according to the invention may not be used as a spacer device.

The device according to the invention comprises at least one plate comprising a plurality of perforations arranged periodically (also referred to as "perforated plate" hereinafter).

Preferably, the plate of the device comprises, or is made of, metal material, such as aluminum and/or stainless steel, and/or a polymer material, such as polyethylene, polycarbonate, polypropylene, polystyrene, polybutadiene, polyisobutylene, polyester, polyurethane, polymethyl methacrylate, polyacrylate, polyamide, polyethylene terephthalate, polybutylene terephthalate, acrylonitrile, butadiene styrene, acrylonitrile styrene acrylate, styrene-acrylonitrile copolymer, or a combination thereof, optionally reinforced with glass fibers.

The plate comprises two main faces opposite each other and bearing the perforations, referred to in the present text as "outer face" (corresponding to the face intended to be closest to the edge of the glazed walls of the glazed unit) and "inner face" (corresponding to the face intended to face the center of the cavity formed between the glazed walls of the glazed unit).

It is possible to define for the perforated plate a length, corresponding to the largest dimension of the plate in the plane of its main faces (also referred to as "main plane of the plate"), a width, corresponding to the dimension of the plate in a direction perpendicular to the direction of the length of the plate, in the main plane of the plate, and a thickness, corresponding to the dimension of the plate in a direction perpendicular to the main plane of the plate (and therefore corresponding to the dimension of the plate between its two main faces).

The perforated plate is preferably rectangular and parallelepiped (that is to say, it has a constant length, width and thickness).

When the device according to the invention is a spacer device, the width of the perforated plate preferably determines the length of the spacing between the glazed walls (that is to say, the thickness of the cavity between the glazed walls) of the glazed unit in which the spacer device is intended to be used. The plate can have a width of 6 to 30 mm, preferably of 10 to 20 mm, for example 16 mm or 20 mm, in particular in the embodiments in which the device is a spacer device.

The thickness of the perforated plate is advantageously from 0.1 to 15 mm, more preferentially from 0.2 to 1 mm. In particular, the perforated plate may have a thickness of 0.1 to 0.2 mm, or of 0.2 to 0.4 mm, or of 0.4 to 0.6 mm, or of 0.6 to 0.8 mm, or of 0.8 to 1 mm, or of 1 to 1 to 1.2 mm, or of 1.2 to 1.5 mm, or of 1.5 to 2 mm, or of 2 to 3 mm, or of 3 to 4 mm, or of 4 to 5 mm, or of 5 to 10 mm, or of 10 to 15 mm.

The plate comprises a plurality of perforations arranged periodically. "Plurality of perforations" means at least two perforations. More particularly, the plate may comprise two, or three, or at least three, or four, or at least four, or five, or at least five, or six, or at least six, or seven, or at least seven, or eight, or at least eight, or nine, or at least nine, or ten, or at least ten, perforations arranged periodically. The more perforations are arranged periodically in the plate, the more the acoustic insulation of the glazed unit in which the device is present is improved. In a particularly preferred way, the plate comprises at least three perforations, more preferentially at least four perforations, arranged periodically.

"Perforations arranged periodically" means that said perforations are identical and are present at regular intervals in the plate (that is to say that the distance between the centers of two adjacent perforations is constant). The perforations are made through the entire thickness of the plate (they extend from the inner face of the plate to its outer face) and allow fluid communication between the spaces located on either side of said plate (that is to say that they allow the circulation of a fluid, and more particularly of a gas, from one space to the other). Advantageously, the periodic perforations are all aligned, more preferentially along a longitudinal axis of the plate (that is to say, in the direction of its length). Even more advantageously, the perforations are arranged along a longitudinal axis of the plate located at the middle of the width of the plate.

The perforations may have any suitable shape. In certain embodiments, they have a cross section (that is to say, in the main plane of the plate) which is circular or substantially circular.

Advantageously, the perforations of the plate are microperforations. "Microperforations" means holes of which the diameter or maximum dimension (in the main plane of the plate) is less than or equal to 8 mm. Preferably, the perforations have a diameter, or a maximum dimension (in the main plane of the plate), of 0.2 to 8 mm, more preferentially of 0.5 to 8 mm. In some embodiments, the diameter or the maximum dimension of the perforations may be of 0.2 to 0.5 mm, or of 0.5 to 1 mm, or of 1 to 2 mm, or of 2 to 3 mm, or of 3 to 4 mm, or of 4 to 5 mm, or of 5 to 6 mm, or of 6 to 7 mm, or of 7 to 8 mm.

In a particularly preferred way, the periodic perforations are distributed over the entire length of the plate. Alternatively, the perforations can be arranged periodically over only part of the length of the plate, for example over a portion of the plate having a length less than or equal to 90%, or less than or equal to 80%, or less than or equal to 70%, or less than or equal to 60%, or less than or equal to 50%, or less than or equal to 40%, or less than or equal to 30%, or less than or equal to 20%, or less than or equal to 10%, of the length of the plate.

For each perforation, a geometric center of said perforation may be defined (simply referred to as "center" hereinafter). The distance between the centers of two adjacent perforations is preferably from 5 to 200 mm, more preferentially from 10 to 110 mm. The distance between the centers of two adjacent periodic perforations can be from 5 to 10 mm, or from 10 to 20 mm, or from 20 to 30 mm, or from 30 to 40 mm, or from 40 to 50 mm, or from 50 to 60 mm, or from 60 to 70 mm, or from 70 to 80 mm, or from 80 to 90 mm, or from 90 to 100 mm, or from 100 to 110 mm, or from 110 to 120 mm, or from 120 to 140 mm, or from 140 to 160 mm, or from 160 to 180 mm, or from 180 to 200 mm.

Advantageously, the open area ratio (that is to say, the ratio of the surface area of all the perforations arranged periodically and the total surface area of the plate (including the surface of the perforations)) is from 0.01 to 8%, preferably from 0.05 to 0.8%. The open area ratio can be from 0.01 to 0.05%, or from 0.05 to 0.1%, or from 0.1 to 0.2%, or from 0.2 to 0.3%, or from 0.3 to 0.4%, or from 0.4 to 0.5%, or from 0.5 to 0.6%, or from 0.6 to 0.7%, or from 0.7 to 0.8%, or from 0.8 to 0.9%, or from 0.9 to 1%, or from 1 to 2%, or from 2 to 3%, or from 3 to 4%, or from 4 to 5%, or from 5 to 6%, or from 6 to 7%, or from 7 to 8%.

The perforated plate delimits a chamber, in the device itself or in the glazed unit in which it is arranged. The chamber is located inside the cavity of the glazed unit.

The thickness of the chamber is preferably from 2 to 200 mm, more preferentially from 5 to 50 mm. The thickness of the chamber corresponds to the dimension of the chamber in a direction perpendicular to the main plane of the plate. In some embodiments, the chamber has a thickness of 2 to 5 mm, or of 5 to 10 mm, or of 10 to 20 mm, or of 20 to 30 mm, or of 30 to 40 mm, or of 40 to 50 mm, or of 50 to 60 mm, or of 60 to 70 mm, or of 70 to 80 mm, or of 80 to 90 mm, or of 90 to 100 mm, or of 100 to 120 mm, or of 120 to 140 mm, or of 140 to 160 mm, or of 160 to 180 mm, or of 180 to 200 mm.

The sizing and configuration of the plate, its perforations and the chamber can be selected as a function of the frequency at which the assembly formed of the plate and the chamber is sought to resonate. Indeed, the relationship between the resonant frequency f of the perforated plate and the thickness of the plate, the thickness of the chamber, the spacing between the perforations and the size and distribution of the perforations may be estimated by the formula:

$$f = 54000. \sqrt{\frac{\sigma}{(L + 0.8D)d}} \qquad \text{[Math. 1]}$$

wherein σ is the open surface ratio (depending on the size of the perforations and their distribution), L is the thickness of the plate in m, D is the thickness of the chamber in m and d is the distance between the centers of two adjacent perforations in m.

Advantageously, the system consisting of the plate and the chamber is configured to resonate in the low frequencies. "Low frequencies" means sound waves with a frequency of less than 300 Hz. For example, the system consisting of the plate and the chamber can be configured to resonate at a frequency less than or equal to 250 Hz, or less than or equal to 225 Hz, or less than or equal to 200 Hz, or less than or equal to 175 Hz, or less than or equal to 150 Hz. In other embodiments, the system consisting of the plate and the chamber can be configured to resonate at a frequency less than or equal to 400 Hz, or less than or equal to 350 Hz.

The plate preferably comprises a single series of perforations arranged periodically. Alternatively, it may comprise several series of perforations arranged periodically in the plate, such as at least two series or at least three series, each series being different from the others (for example, the dimension of the perforations and/or the distance between the centers of two adjacent perforations can be different in each series). When the plate comprises several series of periodic perforations, each series is located in a different portion of the plate (along its length). The presence of several different series of periodic perforations allows the system consisting of the plate and the chamber to resonate at several frequencies, each portion of the assembly of the plate and the chamber which comprises a series of different periodic perforations having a different resonant frequency.

The chamber may comprise an absorbent material on the inside. "Absorbent" means that the material is acoustically absorbent. Thus, it is possible to widen the range of wavelengths absorbed by the glazed unit with respect to the range of wavelengths absorbed by the same glazed unit devoid of the absorbent material. Preferably, the absorbent material is suitable for absorbing wavelengths greater than the wavelengths absorbed by the chamber devoid of absorbent material.

Preferably, the absorbent material is a porous absorbent material. Thus, an acoustic wave incident in the chamber can be dissipated by a visco-thermal effect when it penetrates the porous absorbent material. The presence of such a porous absorbent material in the chamber can make it possible to increase the acoustic performance of the device and therefore to further improve the acoustic insulation of the glazed unit in which it is placed. Preferably, "porous absorbent material" means a material characterized by a porosity greater than or equal to 0.7 and/or an airflow resistivity between 5 000 and 150 000 $N \cdot s \cdot m^{-4}$. The porosity of the material can be measured using a porometer according to the fluid saturation method, by mercury intrusion. Airflow resistivity can be measured according to standard NF EN ISO 9053-1. Preferably, the porous absorbent material is a material having open pores. Thus, the acoustic wave incident on the porous absorbent material can propagate through the porous absorbent material and be dissipated.

The porous absorbent material may have a porosity greater than or equal to 0.75, or greater than or equal to 0.8, or greater than or equal to 0.85, or greater than or equal to 0.9, or greater than or equal to 0.95, for example a porosity of 0.7 to 0.75, or of 0.75 to 0.8, or of 0.8 to 0.85, or of 0.85 to 0.90, or of 0.90 to 0.95, or of 0.95 to 0.99. In a particularly preferred way, the porous absorbent material has a porosity of 0.7 to 0.99, and more preferentially greater than or equal to 0.9. The air resistivity of the porous absorbent material may be from 5 000 to 10 000 $N \cdot s \cdot m^{-4}$, or from 10 000 to 20 000 $N \cdot s \cdot m^{-4}$, or from 20 000 to 40 000 $N \cdot s \cdot m^{-4}$, or from 40 000 to 60 000 $N \cdot s \cdot m^{-4}$, or from 60 000 to 80 000 $N \cdot s \cdot m^{-4}$, or from 80 000 to 100 000 $N \cdot s \cdot m^{-4}$, or from 100 000 to 120 000 $N \cdot s \cdot m^{-4}$, or from 120 000 to 140 000 $N \cdot s \cdot m^{-4}$, or from 140 000 to 150 000 $N \cdot s \cdot m^{-4}$. Preferably, the porous absorbent material has an air resistivity which is from 20 000 to 100 000 $N \cdot s \cdot m^{-4}$.

The porous absorbent material is advantageously a fibrous textile, a mineral wool, a polymer foam or a combination thereof. The fibrous textile may be a textile made of cotton fibers, flax fibers, hemp fibers, coconut fibers, polyester fibers, cellulose fibers, or a combination thereof. The mineral wool may be selected from the group consisting of glass wool, rock wool and combinations thereof. The polymer foam may be selected from the group consisting of melanin foams, polyurethane foams, polyethylene foams, and combinations thereof.

Preferably, the absorbent material may be a granular absorbent material. The granular absorbent material may be sand or a stack of particles made of polymer material. Thus, an acoustic wave incident in the chamber can be dissipated by friction of particles of the granular absorbent material when it penetrates the granular absorbent material.

The absorbent material, preferably porous, may fill the entire chamber. Alternatively, the porous absorbent material may be present only in part of the chamber, for example the volume of the porous absorbent material may be from 2 to 20%, or from 20 to 40%, or from 40 to 60%, or from 60 to 80%, or from 80 to 98%, of the total volume of the chamber.

Alternatively, or in addition, the chamber may comprise a gas. The gas may in particular be air and/or argon, and/or krypton and/or xenon.

The perforations may be covered by a fabric, in part or, preferably, entirely. For example, the fabric can be bonded by any suitable means onto the plate, such as onto the inner face of the plate. Alternatively, or additionally, the fabric may be arranged on a porous absorbent material as described hereinbefore, for example bonded to said porous absorbent material, the porous absorbent material being placed inside the chamber, so that the fabric is against all or part, preferably all, of the perforations. The fabric thus forms against the perforations a screen having a certain resistivity. Without seeking to be bound by any one theory, the inventors estimate that when the sound wave passes through the fabric in order to penetrate the chamber, it encounters a resistivity due to the presence of the fabric, which improves the absorption of the sound energy and therefore the acoustic insulation of the glazed unit comprising the device at the low, medium and high frequencies. When the fabric is attached to a porous absorbent material positioned in the chamber, the acoustic insulation of the glazed unit is further improved. The fabric advantageously has a thickness ranging from 0.1 to 3 mm, preferably from 0.2 to 1 mm. The fabric may be made of any woven natural or synthetic fibers, such as for example cotton fibers and/or flax fibers. The fabric preferably has a porosity of 0.07 to 0.99, and more preferentially of 0.5 to 0.99, and/or an air resistivity of 90 000 to 3 500 000 $N \cdot s \cdot m^{-4}$, more preferentially from 300 000 to 3 000 000 $N \cdot s \cdot m^{-4}$. The air resistivity and the porosity can be measured as indicated hereinbefore. The fabric may have a porosity of 0.07 to 0.2, or of 0.2 to 0.4, or of 0.4 to 0.6, or of 0.6 to 0.8, or of 0.8 to 0.99. The air resistivity of the fabric may be from 90 000 to 300 000 $N \cdot s \cdot m^{-4}$, or from 300 000 to 500 000 $N \cdot s \cdot m^{-4}$, or from 500 000 to 1 000 000 $N \cdot s \cdot m^{-4}$, or from 1 000 000 to 1 500 000 $N \cdot s \cdot m^{-4}$, or from 1 500 000 to 2 000 000 $N \cdot s \cdot m^{-4}$, or from 2 000,000 to 2 500,000

$N \cdot s \cdot m^{-4}$, or from 2 500 000 to 3 000 000 $N \cdot s \cdot m^{-4}$, or from 3,000,000 to 3,500,000 $N \cdot s \cdot m^{-4}$.

Advantageously, the inside of the chamber consists of gas and/or one or more porous absorbent materials as described hereinbefore, optionally covered with a fabric as described hereinbefore.

Referring to FIG. 1, according to a first variant, the device according to the invention comprises at least one rectilinear tubular profile 1. "Tubular profile" means a hollow profile, that is to say a profile comprising a cavity or chamber 2. "Rectilinear profile" means that the profile is straight in the direction of its length (a longitudinal axis of the profile may therefore be defined).

According to this variant, the device is advantageously a spacer device.

The tubular profile 1 comprises at least an upper wall 3, a lower wall 4 and two side walls 5 defining the chamber 2 of the profile. In the present text, the terms "upper" and "lower" are used referring to the orientation of the profile 1 shown on the right-hand side of FIG. 1. However, the profile 1 may of course have any possible orientation, such as, for example, an orientation according to which the longitudinal axis of the profile is vertical or an orientation according to which the upper wall is below the lower wall (as shown in the left-hand side of FIG. 1).

The upper wall 3 comprises a plurality of perforations 6 arranged periodically. Thus, the profile 1 according to the invention is also referred to as "perforated (rectilinear) (tubular) profile" in the present text. The perforations 6 are made over the entire thickness of the upper wall and place the chamber 2 of the profile in fluid communication with the environment outside the profile (that is to say that they allow the circulation of a fluid, and more particularly a gas, from the chamber 2 of the profile toward the outside environment and vice versa).

In this first variant, the upper wall 3 of the profile corresponds to the plate comprising a plurality of perforations arranged periodically of the device described hereinbefore, and the chamber 2 of the profile corresponds to the chamber delimited by the plate described hereinbefore. Thus, all that is described in the present text in relation to the perforated plate and in relation to the chamber delimited by the perforated plate applies to the upper wall 3 of the profile 1 and to the chamber 2 of the profile, respectively.

In this variant, the thickness of the chamber inside the profile 1 is the distance between the upper wall 3 and the lower wall 4 of the profile 1.

The upper wall 3 and the lower wall 4 of the profile may be connected by two side walls 5 (each of the two side walls 5 connecting a longitudinal edge of the upper wall 3 to a longitudinal edge of the lower wall 4). In other embodiments, the upper wall 3 and the lower wall 4 can be connected to one another by any number of walls.

Advantageously, the main plane of the upper wall 3 and the main plane of the lower wall 4 are parallel to one another and, still more advantageously, they are perpendicular to the main planes of the two side walls 5.

Preferably, the rectilinear profile 1 comprises, or is made of, a material as mentioned hereinbefore relative to the perforated plate.

Preferably, the lower wall 4 and/or each of the two side walls 5 has a rectangular parallelepiped shape.

Advantageously, the length of the upper wall 3 of the profile 1 is equal to the length of the cavity between the glazed walls 7 of the glazed unit 10 in which the device is intended to be placed, in the same direction.

Referring to FIG. 2, according to a second variant, the device according to the invention comprises at least one rectilinear bar 11. "Bar" means a solid of rectangular parallelepiped shape. The bar comprises a plurality of perforations 16 arranged periodically. Thus, the bar 11 according to the invention is also referred to as "perforated (rectilinear) bar" in the present text. According to this second variant, the device is advantageously a spacer device.

In this second variant, the bar 11 corresponds to the plate comprising a plurality of periodically arranged perforations of the device. Thus, all that is described in the present text in connection with the perforated plate applies to the perforated bar.

When it is placed in a glazed unit 20 (between two glazed walls 17 of the glazed unit), the perforated bar according to the invention defines a chamber 12 between the glazed walls. This chamber 12 extends from the perforated bar 11 to one of the edges of the glazed walls 17. This edge is advantageously the edge of the glazed walls 17, preferably parallel to the perforated rectilinear bar 11, closest to the perforated rectilinear bar 11.

In this second variant, the chamber 12 formed between the glazed walls extending from the perforated bar to the edge of the glazed walls corresponds to the chamber delimited by the plate described hereinbefore. Thus, all that is described in the present text in relation to the chamber delimited by the perforated plate applies to the chamber 12 formed between the glazed walls extending from the perforated bar to the edge of the glazed walls.

In this variant, the thickness of the chamber 12 corresponds to the dimension of the chamber between the perforated bar 11 and the edge of the glazed walls 17.

Advantageously, the length of the bar 11 is equal to the length of the cavity between the glazed walls 17 of the glazed unit 20 in which it is intended to be placed, in the same direction.

Referring to FIG. 3, according to a third variant, the device according to the invention comprises at least one rectilinear casing 21. "Casing" means a hollow closed structure, that is to say, comprising a cavity or chamber.

The casing comprises at least an upper wall 23, a lower wall 24, two longitudinal side walls 25 (preferably opposite each other) and two transverse side walls 28 (preferably opposite each other) defining the chamber of the casing. "Longitudinal side wall" means a side wall parallel to the longitudinal axis of the rectilinear casing, and "transverse side wall" means a side wall perpendicular to the longitudinal axis of the rectilinear casing. In the present text, the terms "upper" and "lower" are used referring to the orientation of the casing 21 shown on the right-hand side of FIG. 3. Of course, the casing can have any other possible orientation, as shown for example on the left-hand side of FIG. 3. The upper wall 23 of the casing corresponds to the wall intended to face the center of the cavity formed between the glazed walls 27 of the glazed unit 30, the lower wall 24 corresponds to the wall of the casing 11 intended to be closest to the edge of the glazed walls 27 of the glazed unit 30, the longitudinal side walls 25 are intended to be parallel to the glazed walls 27 and the transverse side walls 28 are intended to be perpendicular to the glazed walls 27.

The upper wall 23 and the lower wall 24 of the casing can be connected by two longitudinal side walls 25 (each of the two longitudinal side walls 25 connecting a longitudinal edge of the upper wall 23 to a longitudinal edge of the lower wall 24). In other less preferred embodiments, the upper wall 23 and the lower wall 24 can be connected to each other by any number of longitudinal walls 25. The upper wall 23 and the lower wall 24 of the casing are preferably connected to each other by two transverse side walls 28 (each of the two transverse side walls 28 connecting a transverse edge of the upper wall 23 to a transverse edge of the lower wall 24)

Advantageously, the main plane of the upper wall 23 and the main plane of the lower wall 24 are parallel to each other. Preferably, the main planes of the longitudinal side walls 25 are parallel to each other. Preferably, the main planes of the transverse side walls 28 are parallel to each other. Even more advantageously, the main planes of the upper 23 and lower 34 walls are perpendicular to the main planes of the two longitudinal side walls 25 and to the main planes of the two transverse side walls 28. In a particularly preferred way, the casing 21 according to the invention has a parallelepiped shape, even more preferentially a rectangular parallelepiped shape.

Each of the walls of the casing 21 can independently have a rectangular parallelepiped shape, preferably each of the walls of the casing 21 has a rectangular parallelepiped shape.

In this third variant, it is possible to define for the casing 21 a length corresponding to the dimension of the casing 21 along the longitudinal axis of the rectilinear casing and a width matching the size of the casing 21 in a direction perpendicular to the longitudinal axis of the rectilinear casing, in the main plane of the upper wall 23 of the casing. In a particularly preferred way, the width of the casing 21 is less than the thickness of the cavity between the glazed walls 27 (in the same direction) of the glazed unit 30 in which it is intended to be placed. Thus, in this variant, the device is preferably not a spacer device. Preferably, at least one of the longitudinal side walls 25 (only one or both) is not in contact with a glazed wall 27 when the casing is placed in a glazed unit 30.

The width of the casing 21 can be from 1 to 99% of the thickness of the cavity between the glazed walls of the glazed unit, for example from 1 to 10%, or from 10 to 20%, or from 20 to 30%, or from 30 to 40%, or from 40 to 50%, or from 50 to 60%, or from 60 to 70%, or from 70 to 80%, or from 80 to 90%, or from 90 to 99% of the thickness of the cavity between the glazed walls 27. The width of the casing 21 may be from 5 mm to less than the thickness of the cavity between the glazed walls 27, for example the width of the casing 21 may be from 5 mm to 29 mm, or from 5 mm to 19 mm, or from 5 mm to 15 mm.

The length of the casing 21 may be less than or equal to the length of the cavity between the glazed walls 27 of the glazed unit 30 in which it is intended to be placed, in the same direction. Preferably, it is less than the length of the cavity in the same direction. The length of the casing 21 can be from 1 to 100% of the length of the cavity, for example from 1 to 10%, or from 10 to 20%, or from 20 to 30%, or from 30 to 40%, or from 40 to 50%, or from 50 to 60%, or from 60 to 70%, or from 70 to 80%, or from 80 to 90%, or from 90 to 95%, or from 95 to 100% of the length of the cavity between the glazed walls 27. In certain embodiments, the length of the casing 21 can be from 5 cm to the length of the cavity between the glazed walls 27 (in the same direction as the length of the casing 21).

The upper wall 23 or one of the longitudinal side walls 25 (intended not to be in contact with a glazed wall 27 of the glazed unit 30 when the casing is placed in a glazed unit) comprises a plurality of perforations 26 arranged periodically. Thus, the casing 21 according to the invention is also referred to as "perforated (rectilinear) casing" in the present text. The perforations 26 are made over the entire thickness of the wall and place the chamber of the casing 21 in fluid communication with the environment outside the casing 21.

In this third variant, the wall of the casing 21 comprising the periodic perforations 26 corresponds to the plate comprising a plurality of perforations arranged periodically of the device described hereinbefore, and the chamber of the casing 21 corresponds to the chamber delimited by the plate described hereinbefore. Thus, all that is described in the present text in relation to the perforated plate and in relation to the chamber delimited by the perforated plate applies to the perforated wall of the casing 21 and to the chamber of the casing, respectively.

In this variant, the thickness of the chamber inside the casing 21 is the distance between the wall of the casing comprising the periodic perforations (the upper wall 23 or one of the longitudinal side walls 25) and the wall opposite this wall.

Preferably, the casing 21 comprises, or is made of, a material as mentioned hereinbefore in relation to the perforated plate.

The device according to the invention may be according to several of the variants described hereinbefore at a time. Thus, the device according to the invention may simultaneously comprise one or more perforated profiles 1 and one or more perforated bars 11; simultaneously one or more perforated profiles 1 and one or more perforated casings 21; simultaneously one or more perforated bars 11 and one or more perforated casings 21; or simultaneously one or more perforated profiles 1, one or more perforated bars 11 and one or more perforated casings 21.

The device according to the invention may comprise a single perforated plate. In particular, the device according to the invention can comprise a single rectilinear tubular profile 1 comprising perforations 6 in its upper wall 3 or a single perforated rectilinear bar 11 or a single perforated rectilinear casing 21. However, preferably, the device comprises several perforated plates. More particularly, it advantageously comprises several rectilinear tubular profiles 1 each comprising an upper wall 3 comprising perforations 6 arranged periodically and/or several rectilinear bars 11 comprising perforations 16 arranged periodically and/or several rectilinear casings 21 comprising perforations 26 arranged periodically in one of its walls. When the device comprises several perforated plates, for example several perforated rectilinear tubular profiles 1 and/or perforated rectilinear bars 11 and/or perforated casings 21, said perforated plates, perforated rectilinear tubular profiles, perforated rectilinear bars and perforated rectilinear casings each independently may be as described hereinbefore.

Preferably, when the device comprises several perforated plates, at least some of them are different from one another and they can all be different from one another and/or at least certain chambers delimited by said perforated plates are different from one another and they can all be different from one another. In particular, when the device comprises several perforated rectilinear tubular profiles 1, preferably at least some of them are different from one another and they can all be different from one another. More particularly, they may have perforations 6 with a different periodicity, that is to say perforations 6 of different size and/or perforations 6 arranged differently in the upper wall 3 (for example the distance between the centers of two adjacent perforations 6 may be different). Alternatively, or additionally, they may have an upper wall 3 of different thickness and/or a chamber 2 of different thickness. When the device comprises several perforated bars 11, preferably at least some of them are different from one another and they can all be different from one another. In particular, they may have perforations 16 with a different periodicity, that is to say perforations 16 of different size and/or perforations 16 arranged differently (for example the distance between the centers of two adjacent perforations 16 may be different), and/or have a different thickness. Alternatively, or additionally, at least some chambers 12 defined between said perforated bars and the edges of the glazed walls may be different from one another and they may all be different from one another, in particular the chambers 12 may have a different thickness. When the device comprises several perforated rectilinear casings 21, preferably at least some of them are different from one another and they can all be different from one another. More particularly, they may have perforations 26 with a different periodicity, that is to say perforations 26 of different size and/or perforations 26 arranged differently in the wall (for example the distance between the centers of two adjacent perforations 26 can be different). Alternatively, or additionally, they can have a wall having the perforations of different thickness and/or a chamber 12 of different thickness. Thus, preferably, the perforated plates (in particular the perforated rectilinear tubular profiles 1 and/or the perforated rectilinear bars 11 and/or the perforated rectilinear casings 21) and the chambers that they delimit are such that at least some of the perforated plates, or all of them, resonate, with the chambers that they delimit, at different frequencies.

The device may comprise two or at least two perforated plates (for example, two or at least two perforated rectilinear tubular profiles 1 and/or perforated rectilinear bars 11 and/or perforated rectilinear casings 21) (as described hereinbefore), or three or at least three perforated plates (for example, three or at least three perforated rectilinear tubular profiles 1 and/or perforated rectilinear bars 11 and/or perforated rectilinear casings 21), or four or at least four perforated plates (for example, four or at least four perforated rectilinear tubular profiles 1 and/or perforated rectilinear bars 11 and/or perforated rectilinear casings 21), or five or at least five perforated plates (for example, five or at least five perforated rectilinear tubular profiles 1 and/or perforated rectilinear bars 11 and/or perforated rectilinear casings 21). Preferably, at least two of the perforated plates (for example at least two of the perforated profiles 1 and/or the perforated bars 11 and/or the perforated rectilinear casings 21) have perforations with a different periodicity (that is to say the periodicity of the perforations of a plate (for example of a profile or of a bar or a casing) is different from the periodicity of the perforations of another plate (for example of another profile or of another bar or of another casing), more preferentially, at least three of the perforated plates (for example at least three of the perforated profiles 1 and/or of the perforated bars 11 and/or of the perforated casings 21) have perforations with a different periodicity.

In a particularly preferred manner, the device according to the invention comprises three perforated plates, and more particularly three perforated rectilinear tubular profiles 1 and/or perforated rectilinear bars 11 and/or perforated rectilinear casings 21, or at least three perforated plates, more particularly at least three perforated rectilinear tubular profiles 1 and/or perforated rectilinear bars 11 and/or perforated rectilinear casings 21, and more preferably four (or at least four) perforated plates, and more particularly four (or at least four) perforated rectilinear tubular profiles 1 and/or perforated rectilinear bars 11 and/or perforated rectilinear casings 21. More preferentially three or at least three of these plates (in particular three or at least three of these profiles 1 and/or bars 11 and/or casings 21), with the chambers that they delimit, are configured to resonate at different frequencies.

Even more preferably, the device comprises at least:

- a first perforated plate delimiting a first chamber (in particular a first perforated profile 1 or a first bar 11 or a first casing 21), the system consisting of the first perforated plate and the first chamber being configured to resonate at a first frequency,
- a second perforated plate delimiting a second chamber (in particular a second perforated profile 1 or a second bar 11 or a second casing 21), the system consisting of the second perforated plate and the second chamber being configured to resonate at a second frequency corresponding to one octave-third below the first frequency, and
- a third perforated plate delimiting a third chamber (in particular a third perforated profile 1 or a third bar 11 or a third casing 21), the system consisting of the third perforated plate and the third chamber being configured to resonate at a third frequency corresponding to one octave-third above the first frequency The device may further comprise one or more non-perforated plates (for example one or more profiles, preferably tubular and preferably rectilinear, and/or bars, preferably rectilinear, and/or casings, preferably rectilinear) and/or one or more plates (for example one or more profiles, preferably tubular and preferably rectilinear, and/or bars, preferably rectilinear and/or casings, preferably rectilinear) comprising non-periodic perforations.

Preferably, the device comprises as many plates (more particularly profiles and/or bars and/or casings) as the number of sides of the glazed walls of the glazed unit in which it is intended to be placed, for example it comprises four plates (and more particularly four profiles and/or bars and/or casings).

The plates of the device may be disjointed (all or some of them) or may be joined to one another (all or some of them), preferably at their ends. Preferably, when the device according to the invention is a spacer device, all the plates of the spacer device are joined so as to form a frame. When the plates are joined, they can form a single piece (the plates originate for example from a single plate folded in one or more locations, for example to form the corners of the frame) or may be assembled together by any suitable means, for example by means of staples, glue, clips and/or interlocking. In particular, when the device comprises profiles, these may be disjointed (all or some of them) or may be joined to one another (all or some of them), preferably at their ends. Preferably, all the profiles of the device are joined so as to form a frame. When the profiles are joined, they can form a single piece (the rectilinear profiles originate for example from a single profile folded in one or more locations, for example to form the corners of the frame) or may be assembled together by any suitable means, for example by the means indicated hereinbefore. Likewise, when the device comprises rectilinear bars, the latter may be disjointed (all or some of them) or may be joined to one another (all or some of them), preferably at their ends. Preferably, all the bars of the device are joined so as to form a frame. When the bars are joined, they can form a single piece or can be assembled together by any suitable means, for example by the means indicated hereinbefore. In embodiments in which the device comprises profiles and bars, the upper walls of the profiles and the bars may be joined or disjointed. When the device comprises rectilinear casings, they are advantageously disjointed.

When the device comprises several plates, the chambers that they delimit (for example the chambers 2 in the profiles 1 of the device and/or the chambers 12 formed between the glazed walls of the glazed unit extending from the rectilinear bars to the edges of the glazed unit) can be closed relative to one another (that is to say that they are not directly in fluid communication with one another), for example by the presence of a partition between the chambers, or may be communicating with one another, or some may be closed relative to one another and others communicating with one another. However, when the plates of the device belong to perforated rectilinear casings 21, the chambers that they delimit, that is to say the chambers inside said casings, are closed relative to one another (that is to say, they are not directly in fluid communication with one another).

The invention also relates to a glazed unit comprising a device as described hereinbefore.

The glazed unit according to the invention comprises at least two glazed walls. Advantageously, the glazed walls are parallel or substantially parallel to one another.

In some embodiments, the glazed unit according to the invention may comprise exactly two glazed walls (it is then called a "double glazed unit"), or exactly three glazed walls (it is then called a "triple glazed unit"), or at least three glazed walls.

Within the meaning of the present invention, a "glazed wall" refers to any structure comprising (or consisting of) at least one glass sheet or a glazed assembly. "Glazed assembly" is understood to mean a multilayer glazed element of which at least one layer is a glass sheet. Thus, the glazed walls may for example independently comprise a single glass sheet or alternatively a glazed assembly, for example one made of a laminated glazed unit (as described in more detail below).

The glass sheet can be made of organic or mineral glass. It can be made of tempered glass.

The glazed walls (or one of the glazed walls) may comprise (or consist of) a glazed assembly comprising at least one glass sheet which may be as described above. The glazed assembly is preferably a laminated glazed unit. The term "laminated glazed unit" is understood to mean at least two glass sheets between which at least one interlayer film generally made of viscoelastic plastic material is inserted. The interlayer film made of viscoelastic plastic material may comprise one or more layers of a viscoelastic polymer such as polyvinyl butyral (PVB) or an ethylene vinyl acetate copolymer (EVA) preferably PVB. The interlayer film can be made of standard PVB or of acoustic PVB (such as single-layer or tri-layer acoustic PVB). Acoustic PVB generally consists of three layers: two outer layers of standard PVB and an inner layer of PVB with added plasticizer so as to make it less rigid than the outer layers. The use of glazed walls comprising a laminated glazed unit makes it possible to improve the acoustic insulation of the glazed unit, the acoustic insulation being further increased when the interlayer film is made of acoustic PVB.

Each glazed wall includes two main faces opposite one another corresponding to the faces of the glazed wall having the largest surface areas. Advantageously, the glazed walls independently have a thickness (between their two main faces) greater than or equal to 1.6 mm, for example a thickness of 1.6 to 24 mm, preferably of 2 to 12 mm, more preferably of 4 to 10 mm, for example 4 or 6 mm. The glazed walls of the glazed unit according to the invention may all have the same thickness or have different thicknesses. The greater the thickness and/or the higher the density of the glazed walls, the greater the acoustic insulation. Furthermore, the thicker the glazed walls, the lower the mass/spring/mass of the glazed unit.

Preferably, all the glazed walls of the glazed unit have identical height and width. The glazed unit according to the invention may have any possible form, and preferably has a quadrilateral shape, in particular a rectangular or substantially rectangular shape. Alternatively, the glazed unit may have a circular, or substantially circular, shape, or an elliptical, or substantially elliptical shape, or a trapezoidal or substantially trapezoidal shape.

The glazed walls define a cavity between them. Each of the glazed walls defining the cavity comprises an inner face corresponding to the main face of the glazed wall facing the cavity in question and an outer face corresponding to the second main face of the glazed wall, that is to say corresponding to the main face of the glazed wall opposite the face facing the cavity.

Advantageously, the device according to the invention is positioned in the cavity of the glazed unit, more particularly in a peripheral zone of the cavity of the glazed unit. "Peripheral zone of the cavity" means an area of the cavity adjacent to the edges of the glazed walls and preferably whose width (that is in a direction orthogonal to the edge of the glazed walls, in the plane of the glazed walls) is less than or equal to 20 cm, more preferably less than or equal to 10 cm, more preferably less than or equal to 5 cm.

Preferably, when the device is a spacer device (in particular, when it comprises one or more perforated profiles and/or perforated bars), the one or more perforated plates of the spacer device are each parallel to an edge of the glazed walls (for example, the one or more perforated rectilinear profiles and/or the perforated rectilinear bars are each parallel to an edge of the glazed walls). When the device comprises one or more perforated casings, the perforated casing(s) are preferably each parallel to one edge of the glazed walls.

In a particularly preferred way, the device is placed in the cavity of the glazed unit so that the chamber delimited by the perforated plate is in fluid communication with the cavity of the glazed unit formed between the glazed walls via the perforations of the plate. Thus, preferably, when the device comprises at least one perforated profile 1, it is placed in the cavity of the glazed unit so that the upper wall 3 of the profile(s) 1 faces the inside of the cavity of the glazed unit, the lower wall 4 of the profile(s) 1 being turned toward the outside and the edges of the glazed unit. Thus, the chamber 2 of the perforated profile(s) 1 is in fluid communication with the cavity of the glazed unit via the perforations 6 present in the upper wall 3 of said profiles 1 (that is to say that a fluid, and preferably a gas, can circulate from the cavity of the glazed unit to the inside of the chamber 2 of the profiles 1, and vice versa). When the device comprises at least one perforated casing 21, it is placed in the cavity of the glazed unit so that the wall having the periodic perforations 26 is either facing the center of the cavity of the glazed unit, or facing a glazed wall without being in contact with same.

When the device is a spacer device, the two glazed walls are attached to the spacer device.

More preferentially, when the spacer device comprises at least one perforated profile 1, they are attached to the side walls 5 of the profile(s) 1 of the spacer device, even more preferentially their inner face is attached each to a side wall 5 of the profile(s) 1 of the spacer device.

When the spacer device comprises at least one perforated bar 11, the two glazed walls are preferentially attached to side faces of the bar 11 that are opposite one another.

Advantageously, the glazed walls are attached to the spacer device by bonding, for example by an adhesive, such as a polyisobutylene (PIB) based adhesive, by a silicone mastic or by a double-sided adhesive tape.

A tightness seal can also be present, preferably arranged on the outer face of the spacer device (that is to say the face of the spacer device closest to the edge of the glazed walls), which is preferably the outer face of the lower wall 4 of the profile(s) 1 of the spacer device (when the spacer device comprises at least one perforated profile 1). More preferentially, the tightness seal extends from this outer face to the edge of the glazed walls. This tightness seal can be made with a mastic (referred to as "sealant mastic") based on polyurethane, polysulfide and/or silicone. However, when the spacer device comprises a perforated bar 11, preferably no tightness seal is present on said bar.

The spacer device makes it possible to set the length of the spacing between the glazed walls. The length of this spacing (that is to say, the thickness of the cavity between the glazed walls) can be from 6 to 30 mm, preferably from 10 to 20 mm, for example 16 mm.

When the device according to the invention is not a spacer device, for example when it comprises one or more perforated casings 21, said device, and in particular the perforated casings 21, may be placed on a spacer device. More preferentially, the lower wall 24 of the casing can rest on the spacer device. When the length of the casing is less than the length of the cavity between the glazed walls, the casing 21 can be located in any location in the peripheral zone of the cavity of the glazed unit.

Preferably, the cavity of the glazed unit (between the glazed walls) comprises a gas. The gas may be air and/or argon, and/or krypton and/or xenon. The use of argon, krypton or xenon, in addition to or as a replacement for air, makes it possible to improve the thermal insulation of the glazed unit.

The glazed unit according to the invention can be totally opaque, totally transparent, or partially opaque and partially transparent. Preferably, the glazed unit is at least partially transparent.

One (or more) of the glazed walls may be tinted in its thickness over all or part of its surface. One (or more) of the glazed walls may be entirely or partly covered with an opaque coating, for example a paint and/or an enamel. The opaque coating may be present on the inner face of the glazed wall, or on its outer face, or on both faces, preferably it coats the inner face of the glazed wall. In some embodiments, only one of the glazed walls of the glazed unit is covered with an opaque coating. This glazed wall is advantageously the glazed wall intended to be the outermost glazed wall of the glazed unit when the latter is used in a building facade or exterior window.

In some embodiments, the glazed walls of the glazed unit, or at least one of the glazed walls, may have undergone a treatment in order to improve the thermal insulation of the glazed unit. In particular, the glazed wall(s) may comprise one (or more) insulating layer(s) such as an insulating layer based on metal and/or metal oxide, on one or more of their main faces, preferably on the inner face. When the glazed wall is also covered with an opaque coating (such as an enamel and/or a paint), an insulating layer compatible with the opaque coating is preferably used. Alternatively, the insulating layer and the opaque coating can be arranged on different faces of the glazed wall (for example, the insulating layer may be on the inner face and the opaque coating on the outer face). Again alternatively, when at least one of the glazed walls is a glazed assembly, the insulating layer can be interposed in the glazed assembly, for example between a PVB layer and a glass sheet.

Advantageously, at least one of the perforated plates of the device and the chamber that it delimits are such that the assembly consisting of said perforated plate and said chamber resonates at the so-called "mass/spring/mass" frequency of the glazed unit (for example, at least one of the profiles 1 of the device comprising, on its upper wall 3, perforations 6 arranged periodically is such that it resonates at the mass/spring/mass frequency of the glazed unit and/or at least one of the bars 11 comprising perforations 16 arranged periodically and the chamber 12 that it delimits are such that they resonate at the mass/spring/mass frequency of the glazed unit and/or at least one of the casings 21 comprising perforations 26 arranged periodically is such that it resonates at the mass/spring/mass frequency of the glazed unit). The presence in the glazed unit according to the invention of plates (and more particularly of profiles and/or bars and/or casings) and chambers configured to resonate at the mass/spring/mass frequency of the glazed unit or at a frequency close to same makes it possible to increase the loss of transmission of sound at the frequencies close to the mass/spring/mass frequency of the glazed unit but also at the frequencies higher than the mass/spring/mass frequency.

The mass/spring/mass frequency $f_{msm}$ of the glazed unit may be determined by the following formula:

$$f_{msm} = \frac{1}{2\pi}\sqrt{\frac{\rho_0 c_0^2}{d}\left(\frac{m_{s1}+m_{s2}}{m_{s1}m_{s2}}\right)} \quad \text{[Math. 2]}$$

wherein $\rho_0$ is the density of the air in kg/m$^3$, $c_0$ is the speed of sound in the air cavity in m/s, d is the thickness of the air cavity between the two glazed walls in m and $m_{s1}$ and $m_{s2}$ are respectively the masses per surface area unit of the first and second glazed wall in kg/m$^2$.

Preferably, at least one of the perforated plates of the device and the chamber that it delimits (more particularly at least one of the profiles 1 of the device comprising on its upper wall 3 periodically arranged perforations 6 and/or at least one of the bars 11 of the device comprising perforations 16 arranged periodically and the chamber 12 that it delimits and/or at least one of the casings 21 of the device comprising perforations 26 arranged periodically) are configured to resonate at a frequency corresponding to one octave-third lower than the mass/spring/mass frequency of the glazed unit, or at a frequency close to it. This makes it possible to increase the loss of transmission of sound at the frequencies close to this frequency.

Preferably, at least one of the perforated plates of the device and the chamber that it delimits (more particularly at least one of the profiles 1 of the device comprising on its upper wall 3 periodically arranged perforations 6 and/or at least one of the bars 11 of the device comprising perforations 16 arranged periodically and the chamber 12 that it delimits and/or at least one of the casings 21 of the device comprising perforations 26 arranged periodically) are configured to resonate at a frequency corresponding to one octave-third higher than the mass/spring/mass frequency of the glazed unit, or at a frequency close to it. This makes it possible to increase the loss of transmission of sound at the frequencies close to this frequency.

The presence, in the glazed unit, of a device comprising at least two perforated plates delimiting a chamber (in particular at least two perforated profiles 1 and/or perforated rectilinear bars 11 and/or perforated rectilinear casings 21), at least one plate of which forms with the chamber that it delimits a system configured to resonate at the mass/spring/mass frequency of the glazed unit and at least one other plate forms with the chamber that it delimits a system configured to resonate at one octave-third greater than or less than the mass/spring/mass frequency of the glazed unit, and preferably at least three perforated plates delimiting a chamber (in particular at least three perforated profiles 1 and/or perforated rectilinear bars 11 and/or perforated rectilinear casings 21), at least one plate of which forms with the chamber that it delimits a system configured to resonate at the mass/spring/mass frequency of the glazed unit, at least one other plate forms with the chamber that it delimits a system configured to resonate at one octave-third greater than the mass/spring/mass frequency of the glazed unit and at least one other plate forms with the chamber that it delimits a system configured to resonate at one octave-third less than the mass/spring/mass frequency of the glazed unit, makes it possible to smooth out the sound transmission loss around the mass/spring/mass frequency of the glazed unit and improve the sound insulation of the glazed unit over a wider frequency band around the mass/spring/mass frequency of the glazed unit.

In advantageous embodiments, the glazed unit according to the invention may exhibit acoustic insulation (determined for example by measuring the acoustic weakening index, particularly according to standard ISO 10140) higher than an identical glazed unit but not comprising any perforations arranged periodically in the plates of the device, over a frequency range from 200 Hz to 2000 Hz, preferably from 100 Hz to 5000 Hz, still preferably from 50 Hz to 20 000 Hz.

The glazed unit according to the invention can be used in any application that uses glazed unit. In particular, the glazed unit according to the invention can be a building glazed unit. The glazed unit can be intended to serve as an interface between the outside and the inside of the building and can be for example a facade glazed unit, window glazed unit or door glazed unit. Alternatively, the glazed unit can be intended to be placed inside the building.

The invention likewise relates to a method for manufacturing a glazed unit as disclosed herein before, comprising:

- providing at least two glazed walls;
- providing a device as described hereinbefore;
- arranging the two glazed walls so as to form a cavity between them; and
- introducing the device into the cavity.

In a particularly preferred way, the device is placed in the cavity of the glazed unit so that the chamber delimited by the perforated plate of the device is in fluid communication with the cavity of the glazed unit via the perforations of the device plate.

Preferably, when the device is a spacer device, the manufacturing method comprises a step of attaching the two glazed walls to the spacer device. More preferentially, when the spacer device comprises at least one perforated profile 1, the two glazed walls are attached to the spacer device in such a way that the upper wall 3 of the profile(s) 1 of the spacer device comprising the perforations 6 arranged periodically faces the cavity formed between the glazed walls of the glazed unit.

EXAMPLES

The following examples illustrate the invention in a non-limiting manner.

Example 1—Measurement of the Acoustic Absorption

The acoustic absorption of different metal devices was measured using an impedance tube (Kundt tube) with a diameter of 100 mm.

Three devices each comprising five aluminum profiles having a chamber with a thickness of 5.65 mm (between their upper wall and their lower wall) and a wall with a thickness greater than 0.35 mm were manufactured. In each device, the five profiles were attached to one another by their side faces, the five profiles being arranged in the same orientation (the upper walls of the profiles are all in the same main plane).

In two of the three devices, perforations were pierced in the upper wall of each profile, periodically (along a longitudinal axis of the profile passing through the middle of the width of the profile), the third device was left without perforations. With the exception of the perforations, the three devices are identical.

The perforations of the three devices have the following characteristics:

- device no. 1: perforations with a diameter of 0.8 mm, the distance between the centers of two adjacent perforations being 15 mm;
- device no. 2: perforations with a diameter of 1 mm, the distance between the centers of two adjacent perforations being 30 mm;
- device no. 3: no perforation.

The acoustic absorption of each of the three devices tested as a function of frequency was measured according to standard ISO 10534-2.

The results are shown in FIG. 4.

It is noted that devices no. 1 and no. 2 have a higher acoustic absorption coefficient above a certain frequency. Better absorption of the sound energy is reflected, in a glazed unit, by better acoustic insulation.

An absorption peak for device no. 1 at approximately 1200 Hz and an absorption peak for device no. 2 at approximately 1000 Hz are observed. In order to obtain the absorption peaks of the profiles in lower frequencies, the thickness of the chamber may be increased.

Example 2—Measurement of the Acoustic Insulation of Glazed Units

A first glazed unit according to the invention (glazed unit no. 1) was manufactured. This glazed unit comprises two rectangular glazed walls of non-laminated non-tempered monolithic glass, each having the following dimensions: 1480 mm long, 1230 mm wide and 4 mm thick. The two glazed walls are secured to a spacer device in a peripheral zone of the glazed walls, so as to form between them a cavity with a thickness of 16 mm. The cavity of the glazed unit comprises air. The spacer device consists of four profiles forming a frame. Each profile consists of a tube with a rectangular cross section comprising an upper wall, a lower wall opposite the upper wall and two side walls, connecting the upper wall to the lower wall, on which the glazed walls are attached. Each profile has a chamber with a thickness of 15 mm (between its upper wall and its lower wall) and with a width of 16 mm. Two of the profiles have a length of 1440 mm and the other two profiles have a length of 1165 mm. The profiles are made of composite material including fiberglass and have walls with a thickness of 1.2 mm. The upper wall of each profile comprises perforations aligned and distributed periodically along a longitudinal axis of the profile passing through the middle of the width of the profile. The perforations have a diameter of 4 mm and the distance between the centers of two adjacent perforations is 80 mm.

A second glazed unit according to the invention (glazed unit no. 2) was manufactured. This glazed unit is identical to glazed unit no. 1 except that the distance between the centers of two adjacent perforations is 110 mm and the chambers of the profiles comprise a glass wool lamella, sold by Isover under the trade name Domisol LV, of the same length as the profile in which it is located (that is to say 1440 mm or 1165 mm depending on the profile), with a width of 15 mm and a thickness of 15 mm.

A comparative double glazed unit (glazed unit no. 3) of the 4(16)4 type was also manufactured. This double glazed unit differs from glazed unit no. 1 only in that the profiles do not comprise any perforation.

The spectrum of the acoustic insulation index (R) of the three glazed units was measured as a function of frequency, per the measurement protocol defined by standard ISO 10140.

The results are shown in FIG. 5 and in the table below.

TABLE 1

| Acoustic index | Glazed unit no. 1 | Glazed unit no. 2 | Glazed unit no. 3 |
|---|---|---|---|
| $R_A$ (dB) | 29.7 | 31.2 | 28.9 |
| $R_{A,tr}$ (dB) | 27.2 | 28.8 | 26.2 |
| $R_w(C; C_{tr})$ (dB) | 31(−1; −4) | 33(−2; −4) | 30(−1; −4) |

The acoustic indices are determined according to standard ISO 717-1. It can be seen that the presence of periodic perforations in the profiles of the spacer device allow for an improvement in the acoustic performance of the glazed unit, in particular for the frequencies around the mass/spring/mass frequency of the glazed unit, but also for frequencies greater than the mass/spring/mass frequency of the glazed unit, particularly for the frequencies between 200 and 2000 Hz. An increase in the acoustic indices $R_w$, $R_A$ and $R_{A,tr}$ is thus observed, for glazed units no. 1 and no. 2, compared with the comparative glazed unit no. 3. In addition, the presence of mineral wool in the profiles of the spacer device allows an additional improvement of the acoustic insulation of the glazed unit.

The invention claimed is:

1. A glazed unit comprising at least two glazed walls forming between them a cavity, wherein the cavity comprises at least one device comprising at least one plate, said plate comprising a plurality of perforations arranged periodically and delimiting a chamber arranged in the cavity, an absorbent material being present inside the chamber, wherein the plate and the chamber are configured to resonate at a low frequency lower than 300 Hz and a ratio of a surface area of all the perforations arranged periodically and a total surface area of the plate including a surface area of the perforations is from 0.01% to 8%.

2. The glazed unit according to claim 1, wherein the plate of the device comprises at least three perforations.

3. The glazed unit according to claim 1, wherein the perforations have a diameter or maximum dimension of 0.2 mm to 8 mm.

4. The glazed unit according to claim 1, wherein centers of the perforations are spaced apart by a distance of 5 mm to 200 mm.

5. The glazed unit according to claim 1, wherein the plate has a thickness of 0.1 mm to 15 mm.

6. The glazed unit according to claim 1, wherein the plate and the chamber are configured to resonate at a low frequency.

7. The glazed unit according to claim 1, comprising at least two plates, each comprising a plurality of perforations arranged periodically and delimiting a chamber arranged in the cavity.

8. The glazed unit according to claim 1, wherein at least one plate of the device comprising a plurality of perforations arranged periodically and the chamber that it delimits are configured to resonate at the mass/spring/mass frequency of the glazed unit.

9. The glazed unit according to claim 8, wherein the device further comprises:

at least one second plate comprising a plurality of perforations arranged periodically and delimiting a second chamber arranged in the cavity, said second plate and chamber being configured to resonate at the frequency one octave-third less than the mass/spring/mass frequency of the glazed unit; and at least one third plate comprising a plurality of perforations arranged periodically and delimiting a third chamber arranged in the cavity, said third plate and chamber being configured to resonate at the frequency one octave-third greater than the mass/spring/mass frequency of the glazed unit.

10. The glazed unit according to claim 1, wherein the device is a spacer device attached to each of the two glazed walls and comprises at least one rectilinear tubular profile comprising at least an upper wall, a lower wall and two side walls defining the chamber, wherein the upper wall constitutes the plate comprising a plurality of perforations arranged periodically.

11. The glazed unit according to claim 1, wherein the device is a spacer device attached to each of the two glazed walls and comprises at least one rectilinear bar, wherein the at least one rectilinear bar constitutes the plate comprising a plurality of perforations arranged periodically, said at least one rectilinear bar defining the chamber with the two glazed walls, said chamber extending between the two glazed walls, from the at least one rectilinear bar to an edge of the glazed unit.

12. The glazed unit according to claim 1, wherein the device comprises a rectilinear casing comprising at least an upper wall, a lower wall, two longitudinal side walls and two transverse side walls defining the chamber, wherein the upper wall or one of the longitudinal side walls constitutes the plate comprising a plurality of perforations arranged periodically, a width of said casing being less than a thickness of the cavity between the two glazed walls in the same direction.

13. The glazed unit according to claim 1, wherein a porous absorbent material is present inside the chamber.

14. The glazed unit according to claim 1, wherein the device is positioned in a peripheral zone of the cavity of the glazed unit.

15. The glazed unit according to claim 1, being a construction glazed unit that forms a facade, window or door glazed unit of a building, or an interior glazed unit.

16. The glazed unit according to claim 2, wherein the plate of the device comprises at least four perforations.

17. The glazed unit according to claim 3, wherein the perforations have a diameter or maximum dimension of 0.5 mm to 8 mm.

* * * * *